Nov. 13, 1923.

D. McPHEE 1,473,961

FISH TRIMMING MACHINE

Filed Feb. 16, 1923

INVENTOR
DOUGALD McPHEE

BY

ATTORNEYS

Nov. 13, 1923.
D. McPHEE
1,473,961
FISH TRIMMING MACHINE
Filed Feb. 16, 1923    2 Sheets-Sheet 2
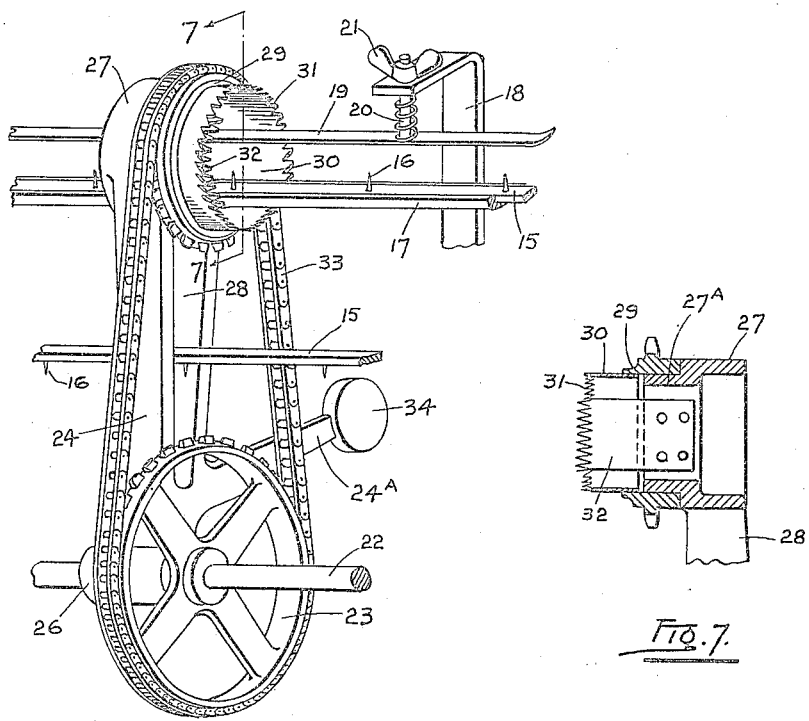
Fig. 3.
Fig. 7.
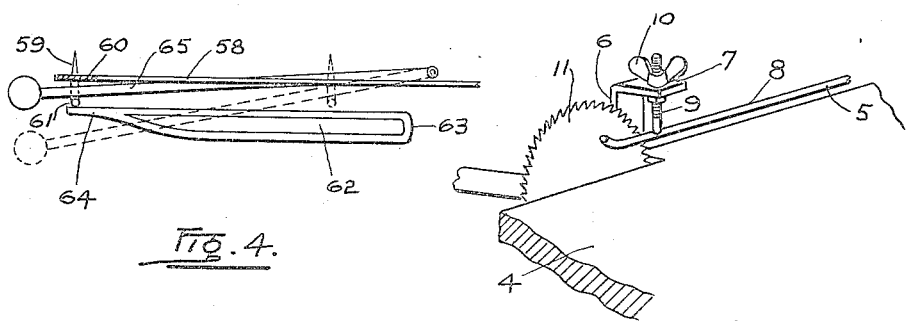
Fig. 4.
Fig. 5.
INVENTOR
DOUGALD McPHEE
BY *Fetherstonhaugh & Co*
ATTORNEYS Patented Nov. 13, 1923.

1,473,961

UNITED STATES PATENT OFFICE.

DOUGALD McPHEE, OF RIVERS INLET, BRITISH COLUMBIA, CANADA.

FISH-TRIMMING MACHINE.

Application filed February 16, 1923. Serial No. 619,409.

*To all whom it may concern:*

Be it known that I, DOUGALD MCPHEE, a resident of Rivers Inlet, in the Province of British Columbia, Canada, have invented certain new and useful Improvements in Fish-Trimming Machines, of which the following is a specification.

My invention relates to improvements in fish trimming machines the objects of which are to produce rapid and efficient means for removing the tails, fins and heads from fish preparatory to cleaning for canning them and consists of essentially cylindrical saws against which the fish are conveyed and a mechanically operated beheading knife under which the fish pass after leaving the saws as will be more fully described in the following specification.

Fig. 3 is a perspective view of the finning mechanism and fish conveyor thereof.

Fig. 4 is a fractional view of the fish spear retracting means.

Fig. 5 is a perspective view of the tail removing saw and fish gauge.

Fig. 7 is a sectional view of the sleeve 27 taken on the line 7—7.

In the drawings like characters of reference indicate corresponding parts in each figure.

Figure 1:
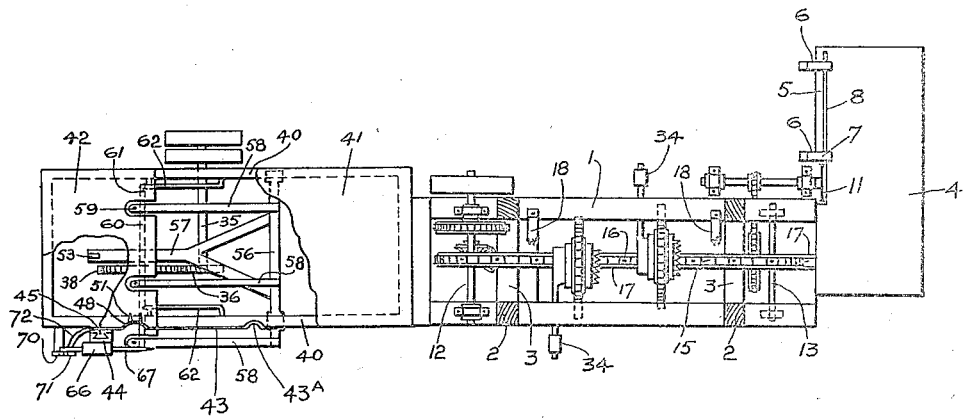
Fig. 1 is a plan view of my invention.

The numeral 1 indicates longitudinal frame members which are suitably supported with legs 2 and connected together by transverse members 3. 4 is a table extending at right angles to the frame members 1. 5 indicates in general a gauge which is positioned above the table 4 and which is provided with a pair of brackets 6 (see Fig. 5) each having an overhanging lip 7. 8 is a horizontal rod upturned at its opposite ends and having a threaded upstanding bolt 9 adjacent each end which passes through lips 7 of brackets 6 and are adjustably secured thereto by flynuts 10 for the purpose of adjusting the height of the rod 8 above the table 4 to conform to a desired thickness of the tail portion of a fish that the entire tail may project beyond the edge of the saw 11. 11 is a circular saw suitably driven and set adjacent one end of the gauge 5 that a fish having been gauged thereunder while being drawn sideways along the table may have the tail severed at a predetermined portion of its body.

12 indicates a drive shaft (see Figs. 1 and 2) to which rotation is imparted from a suitable source, and 13 is a counter shaft co-acting therewith. 14 are chain sprockets upon which an endless conveyor 15 is mounted. 16 indicates a plurality of spikes (see Fig. 3) projecting beyond the face of the conveyor. 17 is a channel extending between the sprockets 14 and under the upper run of the conveyor 15 whereby it is held against deflection. 18 are overhanging brackets. 19 is a presser bar resiliently connected thereunder by threaded spring bolts 20 and which are adjustable for height above the conveyor by means of wing nuts 21 upon the bolts 20.

22 indicates a longitudinal drive shaft driven by suitable gearing from the shaft 12 and upon which is mounted a pair of chain sprockets 23. 24 and 25 are swinging hangers each having an elongated journal 26 (see Fig. 3) at the lower extremity forming a bearing for the shaft 22 and a large sleeve 27 and a trunnion 27[a] (see Fig. 7) at the upper end on which the cylindrical saw carrying sleeve 29 rotates, each hanger 24 and 25 being preferably formed by a pair of members forming a V to provide a space 28 through which the lower run of the conveyor 15 travels. 29 indicates a chain sprocket sleeve rotatable about the sleeve 27 of the swinging hanger 24 which forms a carrier for a cylinder saw 30 secured therein having cutting teeth 31 directed to operate as the travel of the conveyor 15 carries the fish to the saw. 32 is a segmental toothed guard plate held in fixed position within the trunnion 27[a], the teeth of which project beyond the teeth 31 of the saw so that the free ends of the fins of a fish passing through the sleeve 29 are lifted from the fish body so that the cutting edge of the saw engage the fin between such fin and the fish body.

The guard plate at the same time forms a shield protecting the body of the fish from being cut into and thus injuring the flesh. 33 are chains by which the drive is communicated from each sprocket 23 to each sprocket sleeve 27 and the saw 30. 34 are counterweights suitably supported on laterally extending arms 24[a] extending from the hangers 24 and 25 to hold the toothed guard plate 32 in yieldable contact with the side of the fish as it passes through the sleeve 27 upon the conveyor.

The counterweight 34 of the hanger 24 extends in an opposite direction to the arm of the hanger 25 so that the saw carried by the hanger 24 will engage and sever the fins from the back of the fish and the saw carried by the hanger 25 will engage and sever the remaining fins.

The numeral 35 indicates a transverse shaft suitably driven, to which is keyed a pinion 36. 37 is a counter-shaft driven by the pinion 36 from the gear wheel 38. 39 is a cam keyed to the outer end of the shaft 37 the purpose of which will appear later. The numeral 40 indicates a pair of longitudinal bearers which form guides for the fish carrying device and upon which tables 41 and 42 are carried. 43 indicates a guide bar set above the front bearer 40, the end 43ᵃ adjacent table 41 being curved to conform to the shape of the gill bone of a fish, so that when a fish is being positioned by the operator, for conveyance to the beheading knife, he sets the head of the fish with the gill bone under such curved portion.

Figure 2:
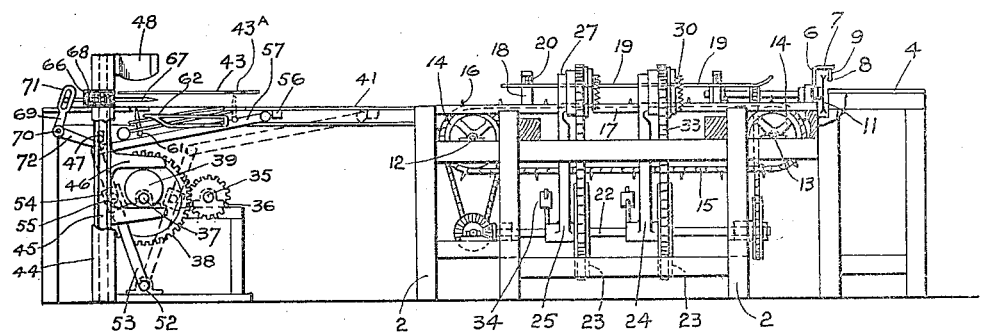
Fig. 2 is a front view of the machine.
Figure 6:
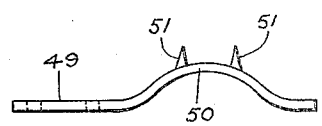
Fig. 6 is a plan view of the beheading knife.

The numeral 44 is a vertical guide upon which is slidably mounted a knife bar 45. 46 is a yoke carried by the bar 45 to contact with the cam 39 to impart a reciprocating movement to the bar. 47 is an inverted spring pawl adapted to engage the arm 72 of the bell crank 69 on the upward stroke of the knife bar 45 and to slide past the crank on the downward stroke. 48 indicates in general, the beheading knife which is bolted to the head of the knife bar 45 and is adapted to overhang the front edge of the table 42. 49 (see Fig. 6) is the knife shank portion whereby it is secured to the bar 45. 50 is the cutting portion which is curved to conform to the shape of the gill bone of a fish. 51 indicates a pair of projections from the inner side of the knife which are adapted to break the gill bones of the fish as the head is being severed therefrom. The numeral 52 (see Fig. 2) is a shaft upon which is fulcrumed a rocking lever 53 having a sliding collar 54 movable endwise thereon. 55 is a pin attached to the collar 54 and turnably engages the gear wheel 39 by freely fitting an orifice formed in such wheel to actuate the lever to travel as shown in Fig. 2.

The numeral 56 indicates a transverse member slidable longitudinally of the bearers 40. 57 is a yoke pivotally connected at its opposite ends to the rocking lever 53 and the transverse member 56. 58 indicates a plurality of flat springs attached at one end to the member 56 and having at each of their opposite ends a spear 59 projecting upwardly thereof to engage the fish that it may be carried from the table 41 to a position under the beheading knife 48. 60 indicates a bar connecting the outer ends of the springs together adjacent the spears 59, the ends of the bar are downwardly offset as at 61 to engage the guides 62.

The numeral 62 indicates generally a pair of guides attached adjacent the longitudinal members 40 (see Fig. 4) which are formed with a broad entering end 63 and a tapering opposite end 64, the purpose of which will hereinafter appear. 65 indicates one of a pair of weighted levers suitably fulcrumed to the frame members 40 which is allowed a limited downward movement as indicated in Fig. 4 by dotted lines.

In the reciprocating longitudinal movement of the springs 58 the offset ends 61 of the connecting bar is carried first along the upper edge of the guide 62 and on reaching the end 64 of the guide the weighted levers 65 depress the connecting bar and the springs 58 thereby withdrawing the spears 59 below the level of the tables 41 and 42, the springs are held in depressed position during the commencement of the return movement by the weighted levers and are so held during the continuance of the travel by the contact of the offset ends under the lower edge of the guides, and on the offset ends 61 of the bar 60 passing from contact with the ends 63 of the guides, the springs 58 are permitted to spring back to normal position thereby projecting the spears 59 above the table level to engage the fish.

The numeral 66, (see Figs. 1 and 2) indicates a casing transversely mounted upon the upper portion of the guide 44 in which is slidably positioned a lateral spear 67 adapted to receive the head of the fish as it is brought under the beheading knife by the spears 59 of the springs 58, the spear 67 is held in normally projected position in front of the beheading knife by a spring 68 within the casing. 69 is a bell crank fulcrumed upon one of the frame members as at 70 and having an upwardly extending leg 71 in sliding engagement at its upper end with the spear 67, and a substantially horizontal leg 72 which is adapted to engage at its outer end with the spring pawl 47 on the upward travel of the knife bar 45 that the spear may be withdrawn from the head of the fish after it has been severed from the body.

Having thus described the several parts of my invention, I will now briefly explain its operation.

The fish to be trimmed is placed upon the table 4 with its tail projecting under the gauge 8 and is moved manually sideways into contact with the saw 11 by which the tail is severed from the body, it is then taken by an operator who places the fish, tail end first, upon the spikes 16 of the conveyor 15, by which it is carried longitudinally of the machine, first being yieldably engaged by the presser bar 19 to hold it in position upon the conveyor, thence passing through the cylindrical saw 30 of the swinging arm 24, which is normally held to engage one side of the fish on its passage therethrough, and to remove the fins therefrom, the fins are raised by endwise engagement with the toothed guard 32 and are also held against the cut of the saw teeth 31, so that a clean cut is made by the saw and the fish is not dislodged from the conveyor.

The cylindrical saw carried by the arm 25 is adapted to engage the opposite side of the fish and remove the remaining fins, when the fish passes further along the machine and is delivered at table 41 whence it is manually placed transversely of the table with the gill bone under the curved portion 43$^a$ of the guide bar 43 and held until the spears 59 on the springs 58 are forced upwardly into the side of the fish, by which it is then carried to a position under the beheading knife 48 the head being impaled upon the spears 67, when the spears are withdrawn and the knife descends severing the head from the body and breaking the gill bones in two places, that the fish may be more readily packed in the can. On the upward travel of the beheading knife, the spear 67 is withdrawn from the fish's head and the head allowed to fall, thus completing the cycle of operations.

What I claim as my invention is:

1. In a fish trimming machine, an endless conveyor, means upon the conveyor for engaging a side of the fish when it is set longitudinally thereon, yieldable means for holding the fish in contact with said engaging means, and means as the fish is carried on the conveyor for automatically severing the fins.

2. In a fish trimming machine, an endless conveyor, means upon the conveyor for engaging a side of the fish when it is set longitudinally thereon, a presser bar yieldably supported above the conveyor and in parallel relation thereto under which the fish is held in engagement with the conveyor, and means as the fish is carried on the conveyor for automatically severing the fins.

3. In a fish trimming machine, an endless conveyor upon which a fish is adapted to be carried, a rotatably mounted cylindrical saw having teeth on its circular edge and through which the conveyor and the fish pass, means for extending the fins from the body of the fish and means for holding the saw teeth in cutting engagement with the fins.

4. In a fish trimming machine, an endless conveyor upon which a fish is adapted to be carried, a rotatably mounted cylindrical saw having teeth, a stationary guard adjacent said teeth, and means for automatically holding the cuting teeth of the saw in engagement with the fins of the fish.

5. In a fish trimming machine, an endless conveyor upon which a fish is adapted to be carried, an arm pivotally mounted at one end to swing a cylindrical saw carried by the opposite end of the arm, means for imparting rotary motion to the saw and means for swinging the arm to retain the saw in cutting contact with the fish as it passes therethrough.

6. In a fish trimming machine, a rotatable cylindrical saw having an annular cutting edge, a fish carrying endless conveyor adapted to pass through the saw, means for holding a fish in alignment with the conveyor, and means for automatically guiding the saw against the body of the fish to sever the fins therefrom as it passes through the saw.

7. In a fish trimming machine, a drive shaft, a swinging arm journalled thereon, a cylindrical saw having a cutting edge carried by said arms and rotated by the drive shaft, an endless conveyor movable through the saw and upon which a fish is adapted to be carried longitudinally, means for normally holding the cutting edge of the saw in close proximity to the conveyor, and means within the saw adapted to simultaneously gauge the position of the cutting edge of the saw to prevent engagement with the flesh of the fish and for raising the fins for severance from the fish body.

8. In a fish trimming machine, a conveyor, means on the conveyor for engaging a side of the fish when it is set transversely thereover and means for severing the head from the body of the fish.

9. In a fish beheading device in combination with a chopping block, a knife curved to conform to the shape of the gill bone of a fish and having one or more cutting projections extending from the knife to break the gill bones as the head is severed from the body.

10. In a fish trimming machine, a plurality of reciprocating springs having fish engaging spears upon their free ends, a beheading knife co-acting with the movement of said springs, means for moving the springs to position the fish under the beheading knife, and means for withdrawing the spears from the fish as the knife is about to descend.

11. In a fish trimming machine, a table, a plurality of reciprocating springs having fish engaging spears upon their free ends, a beheading knife co-acting with the movement of said springs, means carried by the machine for releasing the springs when at one end of their stroke to engage the fish to carry it to a position under the beheading knife and means for holding the fish engaging springs below the table level during the return stroke of the springs.

12. In a fish trimming machine, a table having a reciprocating fish carrying device, a guide positioned at one end of the fish carrying device movement under which the gill bone of the fish is placed, and a knife at the opposite end of the device movement adapted to sever the head of the fish at the gill bone from the body.

13. In a fish trimming machine, a table having a beheading knife, means upon the table for delivering the fish in beheading position under the knife, means overhanging the table upon which the head of the fish is adapted to be impaled as the fish moves into position under the beheading knife, and means for withdrawing the second mentioned means from the head subsequent to its being severed from the fish.

Dated at Vancouver, B. C., this 28th day of December, 1922.

DOUGALD McPHEE.

Witnesses:
J. J. JOHNSTON,
ERNEST E. CARVER.